May 5, 1953  H. F. WILDER  2,637,784
MEANS FOR INCREASING THE TELEGRAPH SIGNALING
SPEED OF SUBMARINE TELEGRAPH CABLES
Filed May 31, 1951  6 Sheets-Sheet 4

INVENTOR.
H. F. WILDER
BY
ATTORNEY

Patented May 5, 1953

2,637,784

UNITED STATES PATENT OFFICE 2,637,784

MEANS FOR INCREASING THE TELEGRAPH SIGNALING SPEED OF SUBMARINE TELEGRAPH CABLES

Harold F. Wilder, Wyckoff, N. J., assignor to The Western Union Telegraph Company, New York, N. Y., a corporation of New York Application May 31, 1951, Serial No. 229,146

12 Claims. (Cl. 178—63)

This invention relates to means for greatly increasing the telegraph signalling speed of submarine telegraph cables of the type which utilizes a ground (sea) return, and more particularly to increase, in a practical and relatively inexpensive manner, the available signalling capacity of existing submarine telegraph cables of the type mentioned.

In order to clearly understand the problems which gave rise to the need for the instant invention, it is necessary to review several of the previous outstanding steps heretofore devised for increasing the signalling speed of ocean telegraph cables.

For many years the speed of signalling was sorely limited by the absence of an amplifying device and the only answer to the demand for additional facilities across the Atlantic was the laying of additional cables, until by the year 1900 a considerable network connected Newfoundland with Eire and England. Under the stimulus of the traffic demand created by World War I the first signal amplifying device, receiving widespread acceptance throughout the industry, the Heurtley Magnifier, appeared. With the tenfold increase in the sensitivity of the receiving apparatus a new factor appeared, the ratio of the amplitude of the received signal to the amplitude of the electrical noise appearing at the cable terminal. Heretofore, the speed of signalling had been limited by the sensitivity of the siphon recorder; the most rapid rate of signal reversal was reached when the trace of the recorder became too small to be read by the cable operator, and the speed of signalling was not limited by the distortion suffered by the signal because of the presence of extraneous interfering currents. These currents are produced by proximity effects between physically adjacent cables, currents in the earth resulting from the operation of nearby industrial and traction systems, residual duplex unbalance currents in the bridge of a duplex operated cable, and currents induced in the cable from natural electrical disturbances.

Corrective networks coupling the receiving bridge of one cable to others terminating in the same cable office considerably reduced the interfering currents seen by the receiving magnifier due to outbound transmission on other cables, but over a period of time the shore ends of the cables were replaced by twin core sections up to a few miles in length to further reduce the systematic noise from this source, and simultaneously reduce the susceptibility to currents produced by industrial operations in the vicinity of the cable station. Of the twin core, one conductor was bonded to earth at sea to obtain a distant ground for the cable apparatus and to obtain partial neutralization of inductive effects between the cable so equipped and other cables in close proximity in the shore end approaches. The increased accuracy of duplex balance required at the higher speeds of signalling made possible by the magnifier was obtained by improved artificial lines and balancing techniques until by 1945 most any desired accuracy of balance could be obtained compatible with the variation in the cable impedance caused by temperature changes in the sea water.

Until 1924 this was pretty much the situation: The magnifier and a secondary relay constituted the receiving device, most cables had been equipped with relatively short sea earths, and the artificial lines and their technique of adjustment had reached a practical and harmonious operating condition. The speed of signalling did not exceed 300 letters per minute and in general the speed was still limited to some extent by the amplifying power of the receiving apparatus and not by the presence of noise currents. In this year the first continuously loaded cable was laid between the Azores Islands and New York and the demand for a more rigorous treatment of the phenomena of cable signalling became imperative. The application of the magnetic loading material to the conductor was not new but the invention of Permalloy, a nickel-iron alloy possessing an extremely high permeability at low flux densities, for the first time made possible the reduction of the cable attenuation to a workable level for speeds three to four times that heretofore attained, providing other factors influencing the magnitude of the noise level arising from natural sources were understood and their detrimental effects on the cable signalling currents eliminated. For it should be understood that the increased speeds could not have been obtained through the use of the Permalloy serving and its reduction on the cable attenuation alone. At the new high speeds the old moving coil type of magnifiers had far too little amplification and were of necessity replaced by vacuum tube amplifiers. Practically speaking the amplification possible with vacuum tube amplifiers for these conditions was unlimited and so for the first time in the history of the art the limiting speed was reached when the ratio of signal amplitude to the amplitude of extraneous electrical noise diminished to a point where the output signal from the signal shaping amplifier was so badly deformed as to be incapable of correctly operating the multi-channel printing terminal apparatus.

A study was then made of the origin of the noise currents from natural sources on ocean cables in order to predetermine the length of the sea earth required for the new type of cable. The study showed that the induction of noise currents in the cable took place in the cable section laid in comparatively shallow water. The mathematical treatment showed that the amplitude of the disturbance decreases very rapidly with propagation through the sea water, the attenuation of the disturbance increasing more and more rapidly as the frequency of the individual frequency components of the disturbance increases, and also as the depth of the shielding layer of water increases.

The expressions for the magnitudes of electromagnetic and electrostatic waves at a depth $d$ are:

$$H = H_0 \epsilon^{-kd}$$
$$E = E_0 \epsilon^{-kd}$$

In these expressions the term $H_0$ or $E_0$ is the intensity of the electromagnetic or the electrostatic field at the surface of the sea, the exponent $k$ is proportional to the square root of the frequency; and the product of $k$ and the factor $d$, the depth of the sea at the point in question, becomes the exponent for $\epsilon$. The value to which $\epsilon$ is raised thus becomes extremely large for depths in excess of 200 fathoms, for frequencies accepted by the pass-band of the receiving apparatus.

If the shore approaches of any continental body of land are examined it will be seen that there most always exists a shelf of the earth extending out under the sea for distances between 100 and 200 nautical miles. This continental shelf does not lie very far beneath the surface of the sea, the depth often varying between 50 and 100 fathoms for as much as 200 miles before dropping off rather rapidly into deep water. It had been noted that some cable stations had "good landings" while others were poor, for at those stations with good landings where the continental shelf is short and plunges into deep water almost at once the noise level from natural disturbances is very much lower than the noise level observed on cables which pass through a hundred or more miles of shallow water before entering the station.

Cable technicians were quick to recognize the increase in noise level on the cables under their control whenever there was an electrical storm in the vicinity of the cable station. At locations where the shallow water persisted for many miles seaward the disturbance continues long after the storm has drifted out to sea, while at a cable station on an island such as at Horta in the Azores the general noise level is strikingly less than at any continental based station, and atmospheric storms only disturb the cable while directly over the island. These experiences inescapably support the mathematical study of attenuation of electromagnetic waves in sea water, practically demonstrating the beneficial shielding effect of the sea water.

At the time the loaded cable was contemplated it was decided, therefore, that to obtain the full benefit of the Permalloy loading the shore end of the cable at New York must be equipped with a very long sea earth. This twin core section of the cable was 104 nautical miles long at New York, while to achieve the same insusceptibility to disturbance at Horta a sea earth for the receiving apparatus only two miles long was required.

To obtain maximum efficiency of the sea earth, the sea end of the second conductor must be grounded to the armor of the cable through an impedance equal to that of the impedance of the cable viewed from the ground outward to the opposite shore. Consider the effect of a disturbance propagated through the water and inducing equal potentials in both the cable conductor and the sea earth conductor at a point between the shore station and the point at which the sea earth is grounded to the cable armor. The electrostatic field of the disturbance will terminate on the armor wires of the cable, but the electromagnetic field will induce in each conductor of the twin conductor sea earth cable section a potential dependent upon the velocity and magnitude of the field. This potential will cause an elecromagnetic wave of energy to be propagated in each direction from the point of induction. In the case of the cable conductor the wave propagated towards the shore will eventually encounter the impedance of the receiving apparatus, while that part of the energy propagated towards the sea will encounter the characteristic or surge impedance of the cable, and all frequency components of the wave will travel outwards along the cable without reflection until dissipated in the resistance of the cable conductor. On the other hand, while that portion of the energy induced in the sea earth conductor travelling towards the shore likewise sees the impedance of the receiving apparatus, the portion moving seawards encounters a direct connection to ground where the twin conductor ceases and the sea earth conductor is connected to ground. This abrupt discontinuity causes a portion of the energy to be reflected back towards the receiving station where it appears as noise and will limit the speed of signalling of the cable.

In the case of a loaded submarine telegraph cable, the impedance of the cable is resistive in character in the upper frequency range where of course the sensitivity of the receiving apparatus is a maximum. Recognizing this characteristic of the loaded cable, the designers of the cable terminated the sea earth lead at sea in a piece of resistance wire having a resistance equal to the characteristic impedance of the cable as viewed from the place of location of the earth termination outward to the opposite shore, effectively balancing both the sea earth conductor and the cable conductor in respect to the effects of induced potentials from natural sources, and greatly increasing its efficiency as a means of increasing the signal to noise ratio of the loaded cable.

The application of these principles of design to the old style non-loaded cables is not feasible for several reasons. The first is the rather staggering expense of laying new twin conductor cable from the shore to deep water in cases where deep water is reached from 100 to 200 nautical miles from shore. In the case of the cable to be discussed in this disclosure the cost of obtaining a new sea earth in deep water for the receiving apparatus would be $1,900,000 exclusive of the cost of the ship's time. Practical difficulties too would be encountered in operation of the extremely high gain amplifiers required within the cable station on shore, surrounded as the equipment would be, by the variable magnetic fields of the office power equipment. Still another objection to the long sea earth for a non-loaded cable arises from the complexity of the terminating impedance at sea required for the sea earth conductor. The characteristic impedance of a non-loaded cable continues to be a complex quantity even at frequencies two or three times that of the original speed of working. Consequently, to simulate the impedance of the cable over the band of frequencies at which the receiving apparatus will be most sensitive, a four or five branch network containing resistance and capacitance elements must be provided at sea. This passive network would appear as an impedance containing the same capacitive reactance and dissipation as that of the cable and neutralization of the potentials induced by the natural source of disturbance would only then be complete.

These prohibitive factors have resulted in no non-loaded cables being equipped with twin conductor sea earths of any great length; the longest being about fifteen miles and frequently much shorter, the objective being to secure an earth for the receiving apparatus at sea just far enough from shore to eliminate the systematic disturbances from adjacent cables in the vicinity of the station alone, and to some extent the natural disturbance of extremely high level in the very shallow water just off shore.

At very high frequencies such as those encountered on a multi-channel telephone cable, the return currents tend to flow entirely in a second conductor surrounding the dielectric of a submarine cable. This outer conductor need not be insulated from the surrounding sea water since at frequencies above 1000 cycles all of the return current is forced to return in the outer conductor because its impedance is far less than that of the sea return. Such a cable would necessarily be equipped with repeating amplifiers at intervals of about fifty miles throughout its length and these amplifiers would be energized by a direct current flowing throughout the length of the cable as a result of an impressed terminal voltage of 2000 volts at each end. There are several reasons why such features are not applicable to old style submarine telegraph cables. In the first place the older type cables are not provided with a return copper conductor and the percentage of return current flowing in the iron armor wires is very small, under 25 per cent, for the frequencies involved in telegraphy (0 to 50 cycles). The shielding effect is therefore insufficient and the cable even if provided with repeaters at intervals throughout its length would not be capable of high speed operation. Other more practical objections preclude the application of these principles, even if the transmission features did not. The newer cables are insulated with polyethylene dielectric material which will permit the application at the cable head of the high potentials necessary for energizing the repeaters; the gutta-percha insulation of the old cables will not withstand this voltage for any length of time, and lastly, the cost of laying these repeaters in the old style cables, many of which are not in condition to withstand disturbance by the grappling apparatus. The old style non-loaded submarine cables therefore appeared doomed to operate at only the relatively low signalling speeds that can be reached even when equipped with signal shaping amplifiers.

Among the objects of the present invention are to greatly increase, in a practical and relatively inexpensive manner, the signalling capacity of an existing submarine telegraph cable of the type that utilizes a ground return; to utilize submerged repeaters in such manner as to eliminate the noise currents which heretofore have seriously limited the maximum signalling speed of submarine telegraph cables of the type aforesaid; to locate a submerged telegraph repeater in such position, relative to the crossing of a submarine cable by another cable at the shore end, that currents in the common sea return will not be amplified by the repeater; to supply power for energizing a submerged repeater from a shore station and provide means to prevent a variation in the contact potential caused by the power current from the repeater to the sea from modulating the input of the amplifier in the repeater; to eliminate the necessity of providing in a submerged telegraph repeater an amplifier having extremely wide limits of permissible signal swing in its input side; to provide a suitable selector switch in a submerged repeater for enabling remote control of various switching, testing and other operations; to prevent noise currents in the vicinity of a shore station from adversely affecting the signals from a submerged repeater in a submarine telegraph cable circuit; to provide means for coupling a shore station signal shaping amplifier to a duplex bridge receiving circuit in such manner as to compensate for the relatively poor transfer admittance characteristic of a submerged repeater; and to provide means at a shore station for continuously scanning the current going out over a submarine cable conductor to energize a submerged repeater and maintaining such current constant.

The foregoing and other objects and advantages will be apparent from the following detailed description of a submarine telegraph cable system embodying the principles of the invention, taken in connection with the accompanying drawings in which.

The following detailed description will explain how the activity and usefulness of an existing old style non-loaded submarine telegraph cable may be doubled or even further increased at low cost. The invention increases the signalling speed of such telegraph cables by effectively increasing the signal to noise ratio by means of a submerged vacuum tube signal shaping repeater and amplifier in the cable at a location beyond which the induction by atmospheric electrical disturbances at sea level of extraneous disturbing currents in the cable ceases because of the shielding effect of deep water. By means of such an amplifier installed in the proper location, it is possible to strengthen the weaker currents received at the repeater at the higher speed until their new amplitude as received at the adjacent shore station is so great as to completely overcome the deforming effects of the extraneous electrical noise induced in that section of the cable which lies on the continental shelf in shallow water between the shore station and deep water.

Figure 1:
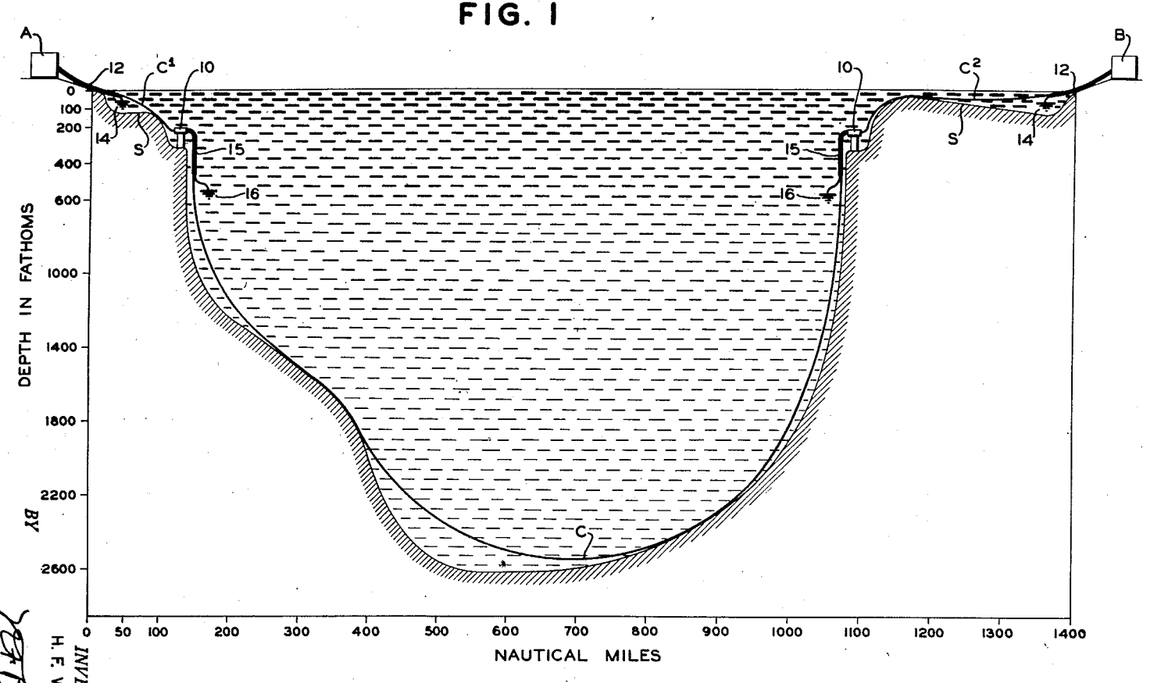
Fig. 1 diagrammatically illustrates a submarine telegraph cable and the general profile of the ocean bed along its route from a shore station in the United States to a shore station in Newfoundland, and also the location of a submerged repeater on the continental shelf at each place for the purposes of the invention.

To illustrate the purposes and advantages of the invention, a submarine cable extending between a shore station at Hammel, Long Island, and a shore station at Bay Roberts, Newfoundland, has been chosen because the poor shore approaches at either terminal typify the application of the invention. This cable was laid down in 1910 and was one of the last of the old style cables in the transatlantic cable network. It has a single copper conductor, and the total resistance and capacity of this 1405 nautical mile cable is 4234 ohms and 492 microfarads. Fig. 1 diagrammatically illustrates this cable and also shows the general contour of the ocean bed in its path, the Hammel shore station being indicated at A and the Bay Roberts shore station indicated at B. The submarine cable is indicated at C, with stub sections $C^1$ and $C^2$ on the continental shelves at the shore approaches, and it will be appreciated that the cable actually lies on the surface of the bed of the ocean, whereas in the figure it is spaced therefrom in various places in order to distinguish the cable from the ocean bed and the continental shelf S at each shore station. From each shore station the stub section $C^1$ or $C^2$ of the cable system passes through a reactively short length 12 of bicore cable. One conductor of the bicore cable, which extends from a shore station out into the ocean, is connected at its outer end, as by brazing, to the armor wire wrapping of the bicore cable to provide a sea earth, as indicated at 14 in Figs. 1 and 2. The other conductor of the bicore cable comprises a continuation of the single conductor of the submarine cable system, and more particularly to a stub section thereof.

On each continental shelf, in water of a depth of approximately 250 fathoms, is positioned a submerged repeater enclosed within a waterproof container 10 for the purposes of the instant invention. The outgoing circuit on the ocean side of each repeater, as distinguished from the shore side thereof, passes through a short length of bicore cable 15, one conductor of the bicore cable being employed to provide a sea earth 16. The continental shelf formation has been exaggerated at the points where the submerged repeaters are positioned in order to show that these repeaters rest on the continental shelf portions and are not suspended in the ocean. The shore approaches of this cable are not favorable at either terminal, since for approximately 115 nautical miles from the shore at station A, and approximately 270 nautical miles from the shore at station B, the cable lies in relatively shallow water of 50 to 100 fathoms and less in places, and as a result of the absence of the shielding effect of deep water the speed of signalling has heretofore been limited to a duplex speed of approximately 400 letters per minute. In the absence of the submerged repeaters in the positions shown, speeds in excess of 400 L. P. M. are not commercially possible since as the signal reversals are more attenuated the distorting effect of the natural disturbance picked up on the cable lying between the shore and deep water becomes excessive and the loss of signal definition precludes the recognition and repeatering of the signals. Operation of this cable is effected with the use of the multiplex code wherein the impulses of the fundamental signal frequency are permitted to become attenuated and are interpolated by special receiving circuits such as described in my Patent 2,046,984, issued July 7, 1936. At such speeds of signalling the signal impulses are so distorted because of the frequency and time delay distortion of the cable that special corrective networks tuned between the fundamental signal frequency and the second subharmonic of this frequency must be inserted between the cable and the vacuum tube amplifier. These shaping networks for correcting the signal distortion are fully described in my Patent 2,136,910, issued November 15, 1938. A further understanding of this method of signalling now in widespread use on all transatlantic telegraph cables will disclose that the corrective networks not only possess exceptional response to a rather narrow frequency band in the vicinity of the signal frequency components that are most greatly attenuated in transmission, but that these networks also discriminate against extremely low frequency currents existing either as components of the signals or present due to natural causes. The discrimination effected by these signal shaping networks eliminates from the subsequent discussion to a great extent the presence of very low frequency disturbing currents in the cable. The absence of these low frequency components from the received and equalized signal arrival curve makes it necessary to restore the signal to the desired form by means of so-called local correction networks following signal amplification. These means for restoring the signal waves to their proper form are shown in my Patents 2,109,982, issued March 1, 1938, and 2,173,740, issued September 19, 1939.

Figures 6, 7:
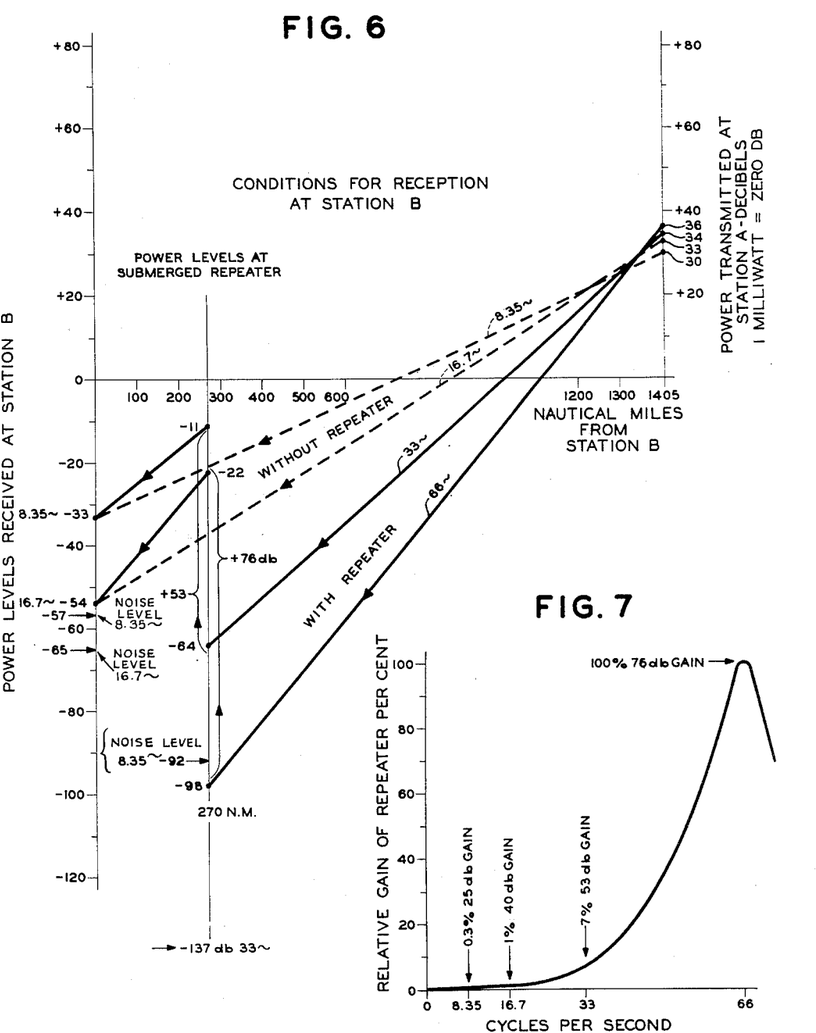
Fig. 6 is a graph depicting the attenuation of telegraph signals at the signalling frequencies employed with the cable of Fig. 1.
Fig. 7 shows the relative gain of the submerged repeater for different frequencies of the signalling currents employed.

The fundamental signal reversal frequency at 400 letters per minute multiplex is 16.7 cycles per second. The second subharmonic frequency is therefore 8.35 cycles and is, by definition, the highest signal reversal frequency that is received at full signal amplitude after equalization, the fundamental frequency being suppressed to about one-fifth normal amplitude to reduce the susceptibility of the receiving apparatus to noise currents. The signal impulses are applied to the cable through a low frequency blocking capacitor at the sending end by means of a repeating relay. A signalling battery potential of 50 volts positive and negative is employed. As the signal wave moves away from the sending terminal the higher frequency components are much more rapidly attenuated than the lower frequencies and so it is with the fundamental frequency, often referred to as the "singles reversals frequency" and with the second sub-harmonic, the "doubles reversals frequency" that we are most concerned. An inspection of Figure 6 shows that the power absorbed and propagated towards the receiving terminal of the cable under consideration is 30 db at 8.35 cycles and 33 db at 16.7 cycles. Since all levels shown in this chart are referred to 1 milliwatt as 0 db the transmitted powers referred to in the preceding sentence are 1 watt and 2 watts respectively. That is, if zero power level is 1 milliwatt then 30 db is 1000 times greater and 33 db is 2000 times greater, and thus a power ratio of 30 db is a power ratio of 1000 to 1, and a power ratio of 33 db is 2000 to 1. The dashed lines show the decline in power as the energy travels towards the receiving station, and the difference in received power levels of —33 and —54 db strikingly shows the necessity for the equalization effected by the receiving signal shaping networks. The rceived voltage at 16.7 cycles is 1.31 millivolts, while the received voltage at the doubles frequency is 16.0 millivolts. These are the voltages that would be measured at the receiving station B, and illustrate the attenuation of the transmitted voltage on the cable from a level of 50 volts at the transmitting station A. The disturbance level for this condition due to natural sources is, of course, quite low, since considerable margin in the signal to noise ratio must exist in order to tolerate the variations that occur during the day in the accuracy of the duplex balance. Under the circumstances the noise level from natural sources is found to be —57 db at 8.35 cycles, and is found to be —65 db at 16.7 cycles.

Figure 5:
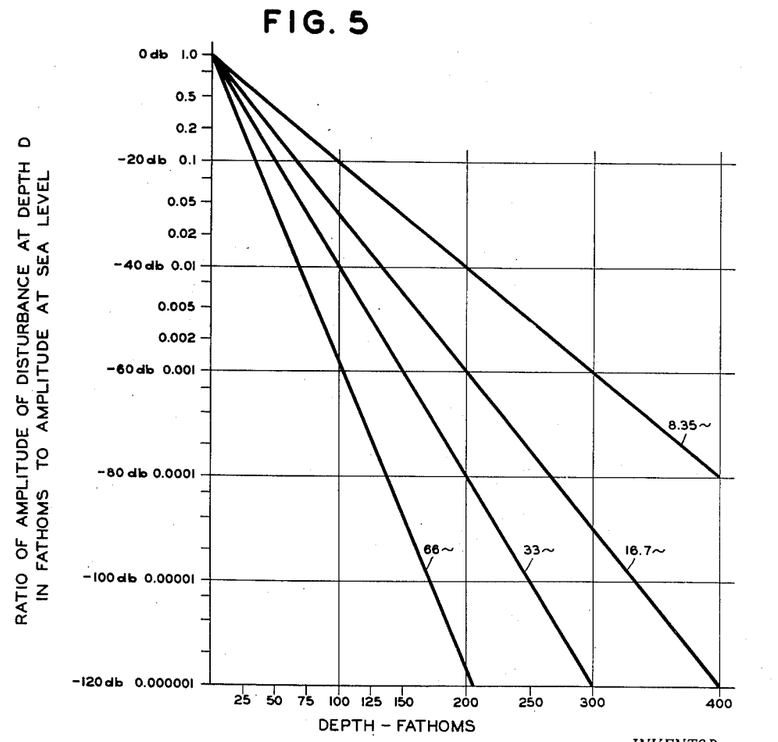
Fig. 5 is a graph showing the ratio of the amplitude of disturbance encountered at varying depths relative to that at sea level.

It is the noise level of —57 db which limits the duplex speed of operation of this cable to 400 letters per minute in each direction. When we consider the source of this disturbance it becomes interesting to first become familiar with Figure 5. This chart shows a plot of the ratio of the amplitude of a disturbing field at the sea bottom to the amplitude at the surface against depth in fathoms for four different frequencies with which we shall be concerned in this disclosure. It should be noted that the ordinate of this plot is logarithmic, with two scales given for convenience. The attenuation for depths ranging from the surface to 100 fathoms for the 8.35 cycle component does not exceed 20 db equivalent to an amplitude ratio of 0.1. However, if the depth is increased to 200 fathoms the amplitude of the disturbance at the bottom of the sea is one-hundredth of the amplitude at the surface. The higher the frequency considered the greater the attenuation suffered in propagation through the sea water, and at 66 cycles for example, a disturbance frequency component of this frequency is reduced to one-millionth of its size at sea level. If all the frequency components of an atmospheric electrical discharge occurring above the sea are integrated over the length of the cable from the shore, it will be found that for all practical considerations the entire disturbance appearing on the cable and detected by the receiving apparatus, has been induced by the exposure of the cable lying in depths of less than 200 fathoms. Supporting this statement, if the sum of the disturbance for a frequency of 8.35 cycles appearing in the cable from all natural sources beyond a depth of 250 fathoms is obtained the level is extremely low at —92 db. For a frequency of 33 cycles the sum of the disturbance for that part of the cable in deep water and beyond the 250 fathom depth is very much less than that at 8.35 cycles, or —137 db. If one could place the receiving apparatus at this depth the noise level would be so low that a very great increase in signalling speed would be made possible.

This gain in signalling capacity may be obtained simply for the cost of insertion on each continental shelf S shown in Fig. 1, of a single amplifying repeater enclosed within a waterproof container, designated by reference numeral 10, in comparatively shallow water insofar as the cable ship's problems of grappling and other operations are concerned. Only a small additional amount of cable is required when making the splices at this shallow depth when inserting the amplifier, and deep water operations are entirely avoided, since there is no technical justification for inserting additional repeaters farther out in the cable because, as has been shown, there is no disturbance to over-ride there anyway. Another practical advantage of this invention is that the voltage necessary to energize the repeater will be relatively low since in most cases the distance from the shore station will be in the order of 100 to 200 nautical miles. The gutta-percha insulation will withstand the low voltages necessary and the amplification of the inserted repeater need be only sufficient to insure that the level of the new signal received at the shore station does not fall below the level of the signal at the former slower speed.

If the signalling capacity of the cable is to be doubled, and we assume for simplicity of design that the cable with a submerged amplifying repeater shall be operated simplex, then the new signalling frequencies of interest will be four times the old, or 33 and 66 cycles respectively. At a distance of 270 nautical miles from the receiving station a depth of 250 fathoms will be encountered, beyond which it will rapidly increase to a depth of over 2½ miles for the rest of its route.

The power absorbed by the cable at the sending end for these frequencies is 34 and 36 db for the same applied transmitting battery of 50 volts. Because of the greater attenuation for these frequencies the signal level at the point where the repeater is to be inserted will be very much lower than for the frequencies at the original speed. As shown in Figure 6, the power level at a point in the cable 270 nautical miles from the receiving station is —64 db for the doubles reversals at 33 cycles and the level for the singles reversals is —98 db. It will be noted that the spread between the power levels for the two frequencies of interest is 34 db as compared with the spread at the receiving station under the original slower speed of 21 db. For this reason a signal shaping network preceding the amplifier of the submerged repeater is necessary in order to equalize this discrepancy and so reduce the range of signal amplitudes that must be passed by the vacuum tube amplifier stages. The response or transfer admittance of the combined signal shaping network and vacuum tube amplifier required at the point of insertion can now be drawn. It is shown in detail in Figure 7. The maximum gain of the submerged repeater must occur at 66 cycles and the gain must be sufficient to restore the level of the 66 cycle singles reversals when received at the shore station to the same level that the 16.7 cycle singles had at the slower speed. Accordingly, the gain of the repeater is adjusted to be 76 db at 66 cycles. In traveling to the shore station these singles reversals are again attenuated from their boosted level of —22 db to the received level of —54 db, precisely the level obtaining under the original condition. The increase in power level required at the doubles frequency of 33 cycles is much less. The repeater is adjusted to have a gain of 53 db at this frequency and the level of the amplified signal leaving the repeater is —11 db, which is reduced to —33 db in propagation to the shore based station. A plot of the response of the repeater shaping network is thus seen to be similar to that obtained from a series resonant circuit, and indeed the shaping network is more or less conventional in form and the desired response is secured from an under-damped series network connected with the cable to earth consisting of an auto-transformer whose primary winding inductance is tuned to resonance at 66 cycles with a receiving capacitor.

It is important of course that the gain versus frequency characteristic of the repeater shall fall off rapidly at the lower frequencies. Too high a gain at 8.35 cycles, for example, would mean that disturbance E. M. F.'s of this range of frequencies would be too greatly amplified, and would appear as noise at the receiving station. It will be observed that the level of the 8.35 cycle disturbance appearing in the sea side of the cable at the repeater point is given as —92 db, and that as the gain of the repeater is only 25 db at this frequency that the noise level impressed on the cable to the shore station is still too low to damage the signal when received at the terminal.

Since the spread in power level between the singles and doubles reversals received at the shore station is the same as was the case for the original speed and at the same absolute power level as before, the same signal shaping amplifier originally employed for equalization of the signal distortion can be used, providing that higher points of resonance for the individual meshes are chosen in the tuning of the network.

Figure 2:
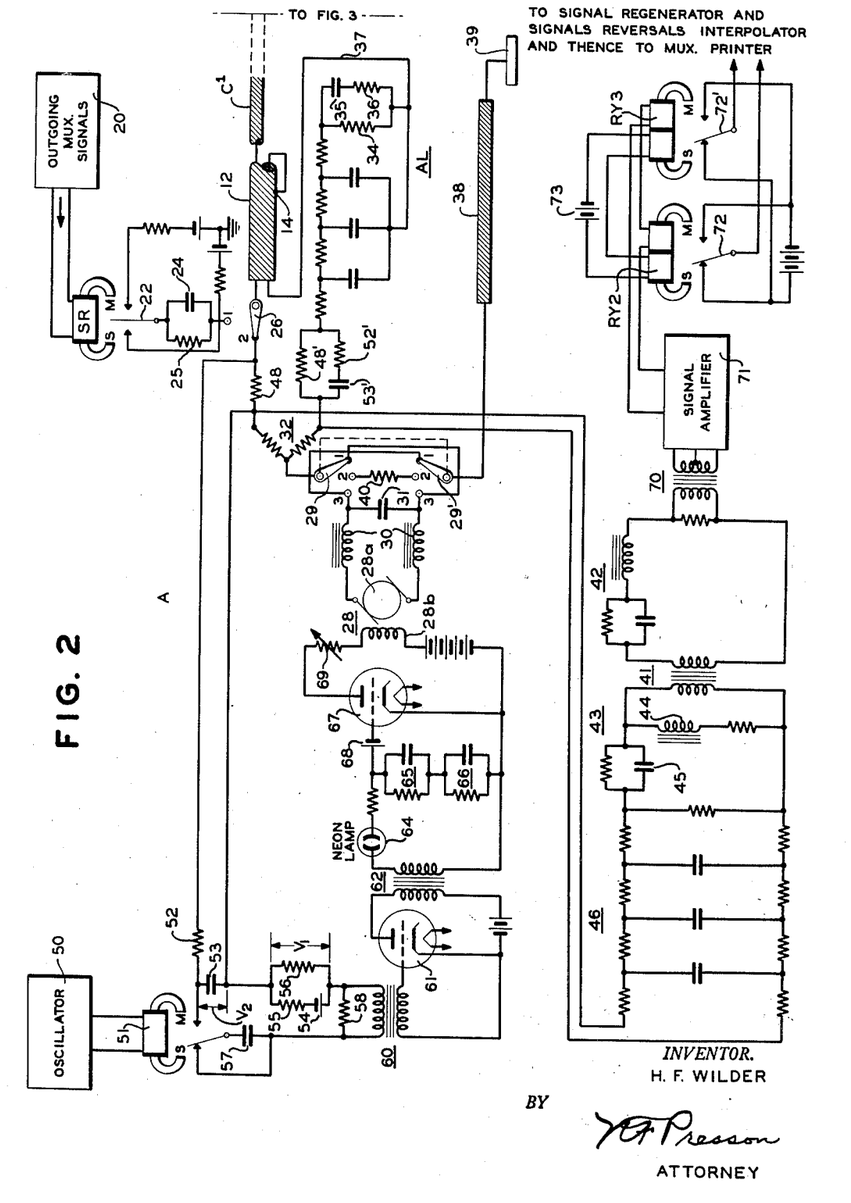
Fig. 2 is a circuit diagram of sending and receiving terminal telegraph equipment in one of the shore stations at one end of the submarine cable system.
Figure 3:
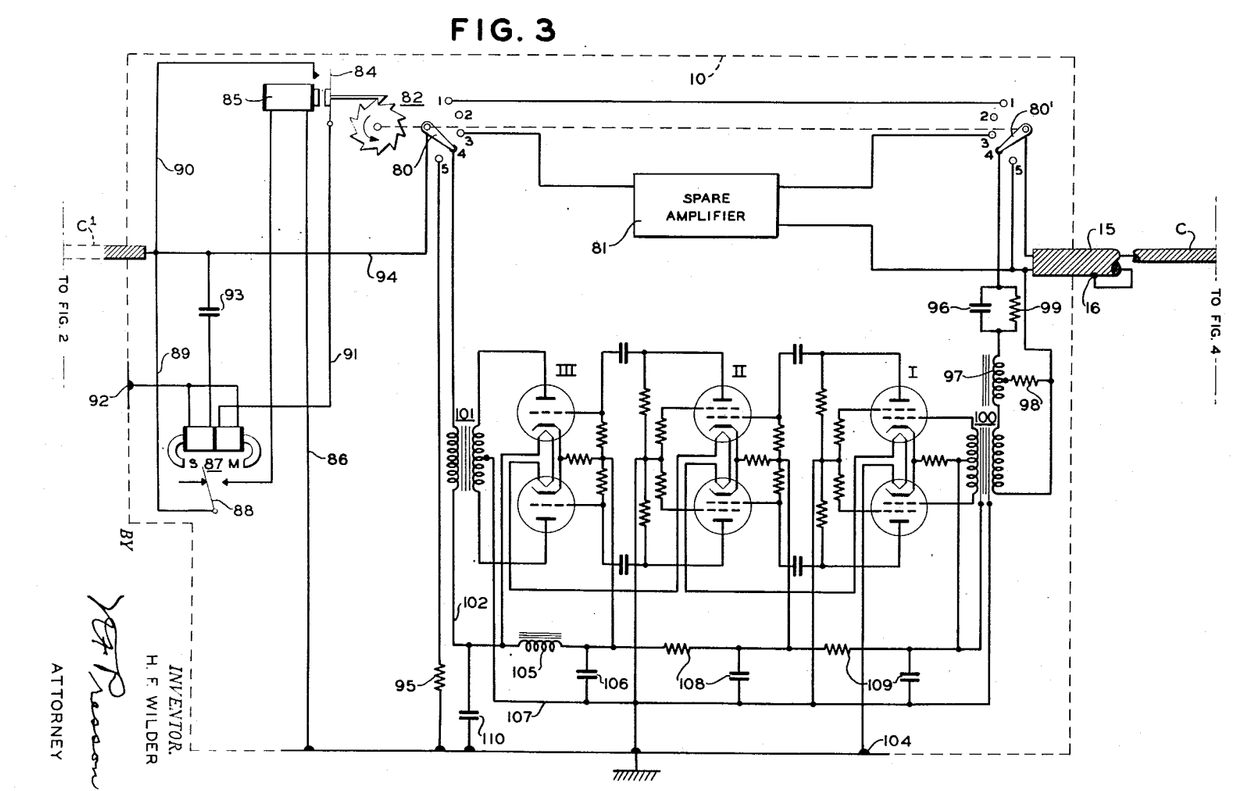
Fig. 3 is a circuit diagram of a submerged repeater operatively associated with the terminal equipment of the shore station shown in Fig. 2.
Figure 4:
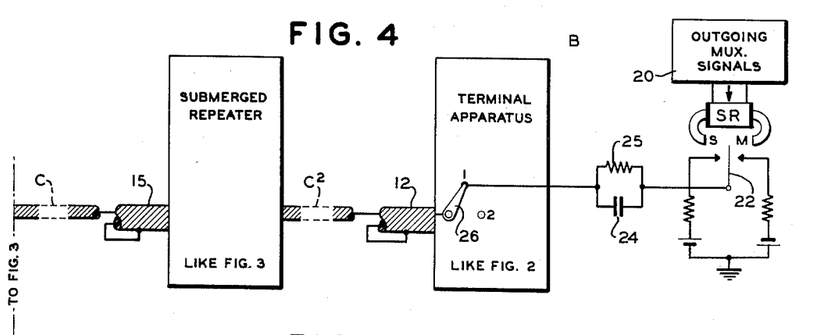
Fig. 4 diagrammatically shows a submerged repeater and its associated terminal equipment at the other end of the submarine cable system.

One practical embodiment of the instant invention is shown in Figs. 2 and 3, in which Fig. 2 shows the circuit of terminal receiving and transmitting apparatus, and Fig. 3 shows the circuit of a submerged repeater inserted in the cable at a point approximately 115 nautical miles from the shore station A at Hammel, and at a point approximately 270 nautical miles from the shore station B at Bay Roberts. The transmitting apparatus at either shore station is over 1100 nautical miles beyond the repeater at the opposite shore station. Multiplex signals are transmitted to the cable at the far end from an armature 22 of a sending-on relay SR, Fig. 1 or 4, through a sending condenser 24 and its shunt resistor 25; a sending battery potential of 50 volts positive and negative is used. One, two or more simplex multiplex channels may be employed in either direction. In the terminal apparatus A and B a manually operable switch 26 is provided with contacts 1 and 2; when the switch is on contact 1, the terminal apparatus is connected for sending signals to the submarine cable C, and when the switch is on its contact 2, the terminal apparatus is in condition for receiving signals from the submarine cable system. As previously explained herein, one objective of the invention is to at least double the signalling capacity of the cable to which it is applied, and since the original total number of letters transmitted per minute was 2×400, or 800 letters per minute under duplex conditions, the new simplex speed must be 1600 letters per minute. The corresponding singles and doubles reversal frequencies preferably are 66 and 33 cycles per second, respectively.

Circuit components of the repeater incapable of withstanding the pressure of the sea water a a depth of 250 fathoms are enclosed in pressure resisting water-tight steel cases, and all components are further enclosed in the oil-filled case 10 to which the sea water pressure is transmitted, as by flexible diaphragms or Sylphon bellows.

Referring now to Fig. 3, the amplifier of the submerged repeater comprises a three stage resistance-capacity push-pull vacuum tube circuit of conventional design, the three stages being indicated at I, II and III. The amplifier is powered by a current of 0.32 ampere sent over the single communication conductor of the cable stub section from the shore station power supply disclosed in Fig. 2, hereinafter described in detail. The circuit constants preferably are arranged so that a voltage of 150 volts is present at the repeater for energizing the plate and screen grid circuits of the amplifying stages which demand a total current of 20 milliamperes. A current of 300 milliamperes is required to heat the cathodes of the six vacuum tubes. The total D. C. current of 320 milliamperes supplied to the repeater over the stub section of the cable between the adjacent shore and the repeater returns to the shore station through the earth. Since the received signal voltage at the repeater is extremely small, of the order of 0.25 millivolt, a short sea earth of 0.25 nautical mile which is formed by the wire armor of the bicore cable 15, is provided for the signal shaping networks within the repeater. Thus, any variation in the contact potentials set up as a result of the power current passing to earth (sea) from the steel repeater case 10 will not be impressed on the input of the repeater amplifier and cause self-oscillation or otherwise deform the input signals.

In practice, two entirely separate amplifiers are provided in the submerged repeater so that a failure of a circuit component or a vacuum tube in one repeater will not mean that the repeater will be out of service, since operations can be transferred to a reserve or spare amplifier 81 in the repeater by means of a selector switch comprising switch arms 80 and 80', which switch may be operated from the shore station in a manner described in greater detail hereinafter. The reserve facilities thus make it possible for the cable repair ship to recover and repair a faulty repeater whenever normal cable ship operations or good weather conditions permit. The switch arms 80, 80' are mounted on a common shaft, as indicated in Fig. 3, and are arranged simultaneously to connect with any corresponding pair of contacts 1 to 5 in the switch bank of contacts. The shaft of the switch arms is actuated selectively by a pawl and ratchet mechanism 82, the pawl being stepped by an armature 84 of a relay 85 when the relay is energized, as hereinafter described. A conductor 86 connects one end of the winding of relay 85 to the steel casing 10 of the submerged repeater, and the other end of the relay winding extends to the marking contact M of a polar relay 87. The armature 88 of the polar relay is connected by a conductor 89 to the single conductor of the stub cable C¹, and the make contact of relay 85 is connected by conductor 90 to the conductor of the stub cable. The armature 84 is connected by conductor 91 to the right hand winding of relay 87 and thence to the steel casing of the repeater, as indicated at 92. The left hand winding of the polar relay 87 is also connected to the steel casing at the point 92, and the other end of the winding is in circuit with a condenser 93 which in turn is connected to the cable conductor. The cable conductor also is connected by a conductor 94 to the switch arm 80.

Operation of the selector switch 80, 80' in the repeater is effected in the following manner: The shore station, Fig. 2, reverses the polarity of the transmitting power supply 28 of that figure, by means of a reversing switch comprising arms 29 and 29', in a manner hereinafter described. This applies positive battery to the conductor of the cable stub C¹ and thence to the repeater, Fig. 3. The resulting surge of voltage at the repeater causes a transient current flow through the condenser 93 thereby operating the polar relay 87 to its marking contact M where it remains because of its magnetic banking effect. Upon operation of the polar relay, the magnet 85 of the selector switch is energized, causing the ratchet mechanism 82 to operate and move the two switch arms 80 and 80' to the next selected position. When the motion of the magnet armature 84 is complete, the contacts 84 close and the circuit is established through the other oppositely poled winding of the polar relay and causes its armature 88 to return to its spacing contact S, thereby opening the operating circuit to the selector switch magnet 85 and allowing the pawl 82 to drop back to a new tooth on the selector switch ratchet. When normal negative battery is again applied to the repeater to restore operation, the transient current through the condenser 93 simply holds the polar relay 87 more firmly on its spacing contact S. Five separate positions are provided on the selector switch, as follows: In position 1 the stub cable $C^1$ and the deep sea section C of the cable are connected to the pair of contacts 1 so that the cable can be operated in the original manner without a repeater at reduced speed. In position 2 of the selector switch both the cable stub $C^1$ and the deep sea section C are open at the repeater, so that the shore stations can test the insulation resistance of the cables; the necessity for the capacitor 93 in this case is apparent. In position 3 the spare or reserve amplifier 81 is cut into service. Position 4 of the switch causes the regular amplifier to be cut into service, as shown in the position of the switch arms in Fig. 3. In position 5 the deep sea section C is connected to sea earth at 16 through the bicore sea earth section 15, and the stub $C^1$ from the adjacent receiving shore station is connected to earth through a known resistance 95 which is equivalent to the load resistance presented by either amplifier. The position of the selector switch permits each terminal end to test its respective cable section for continuity. A sixth position (not shown) of the selector switch also might be employed whereby a sound generator within the repeater case 10 would be energized to enable the cable repair ship to use sonic listening gear to speed location and recovery of a faulty repeater. It will be appreciated that a double set of contacts 1 to 5 would be employed in each of the switch banks, in order that when the ratchet has stepped the switch arms off the pair of contacts 1, the next step would cause them to contact the pair of terminals 5 of the bank, and similarly with respect to contacts 4, 3, 2 and 1.

Equalization of the signal amplitude distortion is effected by the shaping network which comprises the receiving condenser 96, shown at the input side of the amplifier in Fig. 3, the shaping network including the primary inductance of the autotransformer 97. The resonant circuit is damped by the series resistor 98, and the admittance of extremely low frequency signal components is controlled by the receiving condenser shunt 99. The shaped signal is impressed on the primary of the input coupling transformer 100, which latter is specially shielded since the cathode and control grid circuits of the vacuum tube amplifier are at a high negative potential with respect to earth.

Power current to the repeater flows through the secondary winding of the output transformer 101 and thence to the heater circuit 102 and to earth by means of the repeater casing 10 at the point 104. The high negative voltage of 150 v. potential is filtered by means of the inductor 105 and the capacitor 106 before it is applied to the cathode return of stage III of the amplifier. Two resistance-capacity filters 108 and 109 in cascade still further stabilize the voltage applied to the first and second stages I, II of voltage amplification of the repeater. To improve the efficiency of the coupling of the output transformer 101 to the cable stub $C^1$, a capacitor 110 is provided for shunting the resistance which would otherwise be presented by the repeater to the high frequency components in the amplified signal.

Extremely great stability of the power current is necessary in view of the high over-all gain of 76 decibels of the submerged repeater. The means by which the power current to the repeater is regulated is disclosed in Fig. 2, which shows the adjacent shore terminal apparatus for the operation of the submerged repeater. The basic source of power must be capable of supplying a current of the order of twice that actually required by the repeater, and susceptible to constant current regulation over a range of voltage sufficient to compensate for earth current potentials that will from time to time appear between the terminal and the repeater. The source may be a regulated rectifier system, but for the purposes of illustration a direct current generator 28 with a vacuum tube regulated field control is shown; the method of field control is described in detail hereinafter. A filter 30, 31 between the output of the generator armature 28a and the load serves to suppress commutator ripple. The voltage applied to the apex of the 250 ohm resistive bridge arms 32 may, for example, be 506 volts, with a resultant current into the bridge apex of 640 milliamperes. This current will divide equally, one-half flowing out to the repeater and the other half flowing into an artificial line AL terminated in a resistor 34 and an impedance comprising capacitor 35 and resistor 36. The latter simulates the reactive portion of the repeater load, while the former dissipative element 34 represents the D. C. load absorbed by the heaters of the vacuum tubes and their plate currents. In order that the receiving system will not be affected by noise potentials in the vicinity of the shore station, the artificial line AL is connected by means of a conductor 37 to the sea earth 14 of the bicore cable 12. To prevent electrolysis of the earth connection at the sea end of this bicore cable and of the repeater itself, negative battery potential is applied to the apex of the receiving duplex bridge 32. The positive pole of the direct current generator 28 is taken out to sea over a single conductor cable 38, which is approximately 0.1 nautical mile long and is earthed by means of a lead plate 39. The return power current from the repeater is in this way confined to this electrode and does not enter the cable station by means of the armor of other cables, which would over a period of time be eaten away by the current flow. The three-position switch comprising switch arms 29 and 29' is manually operable for reversing the potential to the stub cable $C^1$ whenever it is desired to operate the selector switch at the repeater, that is, the switch arms, which are on a common shaft, are manually moved from the pair of contacts 1 to the pair of contacts 3 for effecting each desired stepping movement of the ratchet mechanism of the selector switch. As the switch arms are moved from contacts 1 to contacts 3, they engage contacts 2 in the intermediate position whereby the switch discharges the cable through a high resistance 40.

In the lower portion of Fig. 2 is shown a conventional signal shaping amplifier 71, with its input transformer 70, and preceded by shaping networks 42 and 43, which may be in accordance with my aforesaid Patent 2,136,910. The isolating transformer 41 isolates the second shaping network 42 from the high potential of the receiving duplex bridge 32. The first shaping network 43 including the magnetic shunt 44 and the receiving condenser 45, is not directly connected to the receiving bridge but is preceded by a higher frequency discriminating network 46. This is a low pass filter network composed of sections of series resistance and shunt capacitance. The constants of the network are chosen such that the product of the total series resistance in ohms and the total shunt capacitance in microfarads will be substantially equal to that of a section of actual non-loaded submarine cable 100 miles or more in length. In practice, in the embodiment illustrated herein, the total series resistance may be approximately 300 ohms and the total shunt capacitance may be of the order of 40 microfarads. This would be subdivided into ten or more sections in practice, whereas only three sections are shown for purposes of illustration in Fig. 2. The purpose of the insertion of this low pass filter is to compensate for the low transfer admittance of the submerged repeater amplifier at very low frequencies. The effect of the network is to deliberately suppress the higher frequency components of the signal, and since it is connected across the cable bridge 32, any noise frequency components present will similarly be attenuated by this network so that the effective signal to noise ratio remains unimpaired. However, low frequency signal components are not attenuated greatly by this network and therefore appear in the signal shaping network 43, 44, 45 in greater proportion with respect to the high frequencies than would be the case if the shaping network were directly connected to the cable bridge 32. The resultant emphasis of the very low frequencies of the repeater in relation to the high frequency components facilitates shaping the signals with a conventional shaping network and signal amplifier.

Figure 8:
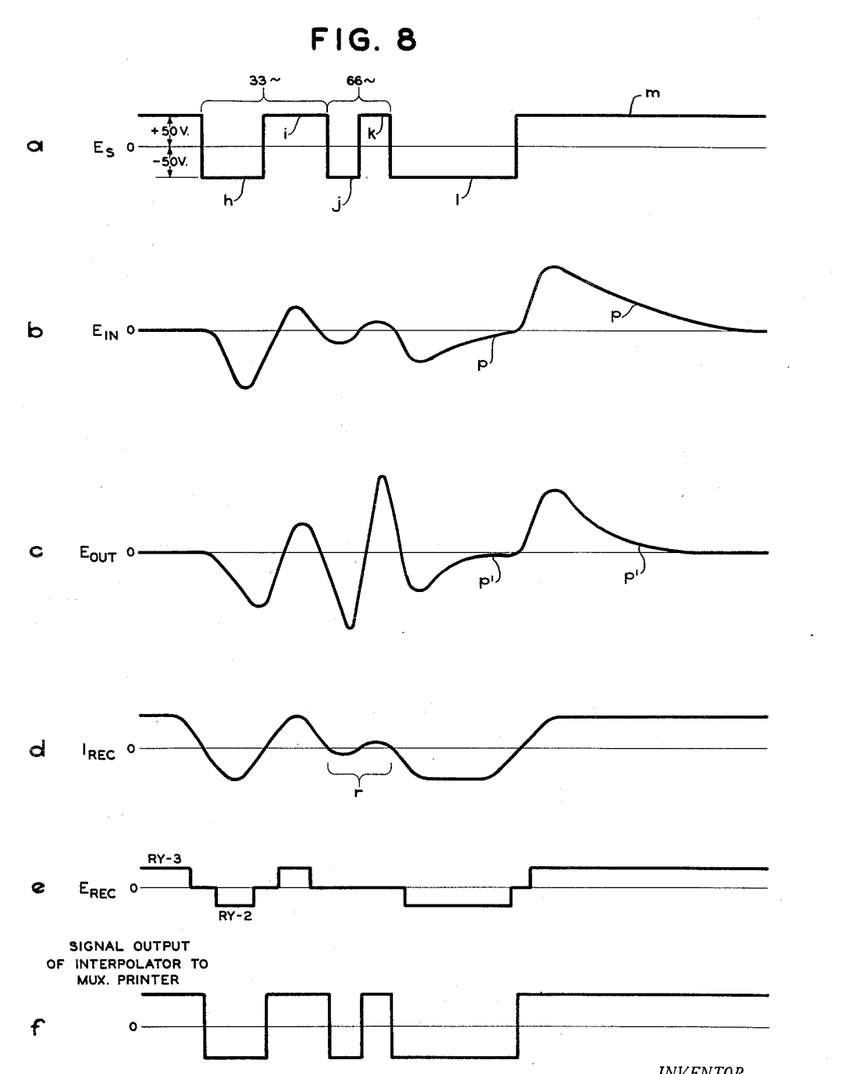
Fig. 8 illustrates wave forms of potential or current which obtain at various points throughout the cable system disclosed herein.

Fig. 8 illustrates six wave forms designated $a$ to $f$, inclusive, representing certain potential and current wave forms which are present at different places throughout a cable system of the character disclosed. In $a$ is shown the potential on the armature 22 of the send-on-relay SR, which is applied to the cable stub $C^1$ or $C^2$, depending upon the direction of transmission, through a sending block capacitor 24. This wave form illustrates the transmission of a "doubles" reversal composed of the spacing impulse $h$ (representing two successive spacing units of the permutation code signals) followed by a marking impulse $i$ (representing two successive marking units of the code), which doubles reversal has a basic frequency rate of 33 cycles per second, and a "singles" reversal composed of the spacing impulse $j$ and marking impulse $k$ having a basic frequency of 66 cycles per second, followed by a spacing impulse $l$ of a plurality of units long followed by a single cross-over to marking polarity $m$. These rectangular wave forms contain all frequency components from zero to infinity. We are primarily interested, however, in the specific illustration given, in the performance of the system over a frequency band of from zero to 66 cycles. Frequency components above 66 cycles are not employed in the synthesis of the finally shaped signal operating the receiving relays RY2 and RY3, Fig. 2, at the shore terminal.

Curve $b$ represents the wave form of this combination of signals as received at the input of the submerged apparatus following transmission over the deep sea section of the cable. After equalization at the submerged repeater by means of the shaping network 96 to 99, Fig. 3, these signals have substantially the same form as shown in curve $c$ and impressed upon the control grids of the first stage I of the repeater by means of the input transformer 100. In transmission over the deep sea section of the cable, as shown in curve $b$, the extremely high frequency components above 66 cycles have been so attenuated that both the 33 cycle reversal and the 66 cycle reversal have a sinusoidal wave form, and because of the far greater attenuation for 66 cycles this reversal is in actuality very much less in magnitude than the 33 cycle reversal. Due to the high value of the sending condenser shunt resistance 25, any sustained voltage composed of a plurality of either marking or spacing impulses, slowly declines to zero as indicated at $p$, $p$ in curve $b$.

The primary purpose of the insertion of the submerged repeater is to greatly increase the amplitude of the frequency components of the signal ranging from somewhat below 33 cycles to 66 cycles with particular emphasis on the increase in the amplitude of the latter. In Fig. 7, the relative gain of the repeater is shown and it will be seen that the gain of the repeater at 66 cycles is of the order of fourteen times that at 33 cycles.

In curve $c$ of Fig. 8, the output voltage following amplification by the submerged repeater is shown as $E_{OUT}$. This wave form has been drawn to show how greatly the 66 cycle signal reversals have been emphasized and amplified and as they appear in the output transformer 101, Fig. 3. The doubles reversals at 33 cycles have also been amplified but by no means to the same extent as the weaker 66 cycle components. Curve $c$ also illustrates the effect of the lower transfer admittance of the submerged repeater at extremely low frequencies in that the wave form declines to zero during the interval $p'$ more rapidly than on the input side of the repeater, due to the effect of the output transformer 101.

By the time the signal voltage developed in the secondary of the output transformer 101 has been propagated over the stub cable between the repeater and the adjacent shore terminal, the singles reversals have again been far more attenuated than the doubles reversals, as seen in curve $d$ which depicts the current in the differentially connected output relays RY2 and RY3 of the shore based signal amplifier 71, Fig. 2. This signal current is the result of signal shaping by means of the networks 41 to 45 in the shore amplifier. These networks may be in accordance with those disclosed in my aforesaid Patent 2,136,910. In this final wave form of current, the amplitude of the doubles reversal is equal to that of all lower frequency components but the amplitude of the singles reversals frequency is about 15% of maximum. The zero or D. C. frequency component has been restored to the signal by means of local correction in a manner disclosed in my aforesaid Patent 2,109,932.

Both output relays of the shore based amplifier are electrically biased, due to their biasing windings and battery 73, to their spacing contacts S by a magnetomotive force approximately one-half the magnetomotive force developed by the signal current $I_{REC}$ from the amplifier. As a consequence of this electrical bias, relay RY3 is only operated to its marking contact M for a sent potential of $+50$ volts. As the wave form declines to zero, relay RY3 is restored to its spacing contact S by the biasing winding. Conversely, relay RY2 is operated to its marking contact M whenever the sent potential is negative 50 volts and is restored to its spacing contact S when the current wave form is reduced to half its negative value. Since the singles reversals are only about 15% as large as the doubles reversals, neither relay is operated in the interval indicated at r in curve d of Fig. 8. This relay operation is shown in curve e as E_REC. This voltage is the signal potential applied to the signal regenerator and "singles" reversals interpolator, the circuit of which may be in accordance with my aforesaid Patent 2,046,984. This device is a means for scanning the output of the receiving relays RY2 and RY3 restoring the form of the "doubles" reversals to that originally obtained at the sending end and for synchronously filling in or interpolating the suppressed singles reversals. The signal output of the interpolator is a replica of the sent potential shown in curve a and is communicated to the receiving multiplex printers by means of time division multiplex telegraph apparatus well known in the art.

As hereinbefore set forth, the submerged repeater on a continental shelf at the approach to a shore station is located at a boundary between deep water on the ocean side and relatively shallow water on the shore side of the repeater, and in practice the depth of the water at the boundary should be at least from 200 to 250 fathoms and preferably the latter depth. As has been noted from Fig. 5, at these depths the shielding effect is sufficient to insure that the amplitude of the noise potential induced in the deep sea section of the cable will be negligible in comparison with the size of the signals received at the submerged repeater. This is evident from Fig. 6 hereinbefore discussed, where it is shown that th sum of the disturbances for a frequency of 8.35 cycles appearing in the cable at a depth of 250 fathoms has the extremely low level of minus 92 db. Similarly, the sum of the disturbances for 33 cycles at a depth of 250 fathoms is minus 137 db. The noise level for 66 cycle disturbance is very much less than that of either of the aforementioned lower frequencies. The received signal level at the point of insertion of the submerged repeater, at the two significant frequencies of 33 cycles and 66 cycles is very much greater than the corresponding noise levels; for example, the signal level for 33 cycles is 73 db above that of its corresponding noise level.

The current to the submerged repeater is maintained constant irrespective of earth current potentials in the cables or speed variations in the prime mover of the D. C. generator 28 of Fig. 2 by means of a special vacuum tube comparison and control circuit. A resistor 48 of, for example, 50 ohms is inserted between the resistive bridge arm 32 and the cable, and a like resistance 48' is inserted in series with the artificial line AL to provide the same D. C. resistance to the artificial line as 48 does to the cable stub. The nominal voltage drop across the resistor 48 in series with the cable should be precise, for example, 16.00 volts, and it is this voltage drop which is constantly scanned and corrected by the control apparatus. In the illustrative embodiment, scanning and control is effected in the following manner: A local oscillator 50 of any suitable type drives a relay 51 continuously at some moderate frequency, such as 30 cycles per second. The 16-volt potential developed across the resistor 48, in series with the cable, as a result of the current to the cable of 320 milliamperes, is filtered by a resistance-capacity network 52, 53, and the voltage from which any signal voltages coming from the repeater have been removed thus appears across the condenser 53. At the input to the artificial line AL is a resistor 52' of the same value as resistor 52, and a condenser 53' of the same value as condenser 53, thereby to balance the combined impedance of elements 52 and 53 on the stub cable. A comparison voltage exactly equal to the voltage from the resistor 48 is obtained from a battery 54 and a potentiometer circuit 55, 56, and this voltage V1 of 16 volts appears across the resistor 56. A study of the comparison circuit will show that when the armature of relay 51 is on its spacing contact S that the "dipper" capacitor 57 is discharged but that when the armature of the relay makes contact with its marking contact M, the voltage from the cable will be connected to the comparison voltage V1 through the resistor 58 and the capacitor 57.

If there has been a change in the current to the submerged repeater since the last comparison, 1/30 of a second previously, then a transient charging current to the condenser 57 will flow through the resistor 58. This transient impulse will appear in the secondary of the isolating transformer 60 and will be amplified by the vacuum tube amplifier 61. The polarity of the impulse will be dependent upon whether the current has decreased or increased slightly from its nominal level of 320 ma. If the current is unchanged, successive impulses will be of the opposite polarity and when amplified will so appear in the secondary winding of the amplifier output transformer 62. Each impulse will break down the neon lamp 64, and the small increments of charge thus deposited on the condenser integrating network 65, 66 will be of opposing polarity and the voltage on the control grid of vacuum tube 67 will be equal to the fixed bias voltage 68. The plate current of tube 67 flows through the field coil 28b of the D. C. generator 28 and remains undisturbed at the level previously manually set by the rheostat 69. Assume, for purposes of illustration, that an earth current potential appears between the shore station and the submerged repeater, and that this potential is in such a direction as to oppose the current flowing in the cable. The current will decrease very slightly and at the scanning instants the voltage V1 will be greater than the voltage V2 from the cable, and consequently there will be a series of positive impulses through the neon lamp following amplification by tube 61. These positive impulses will be accumulated on the integrating network and the net voltage on the control grid of tube 67 will be more positive than normally. The resulting increase in plate current of tube 67 through the field 28b of the generator 28 will increase the terminal voltage of the machine and restore the current to the cable to the required value of 320 ma., irrespective of the presence of the earth current in the cable.

The operation just described will also take place if the speed of the generator should slowly decrease, thus lowering the generated voltage. The opposite operation will take place to compensate for an earth current of the opposite polarity or an increase in the speed of the D. C. generator. Since the scanning operations take place so frequently, the current to the cable is never permitted to change sufficiently to affect the amplification of the amplifier in the submerged repeater. For purposes of illustration the D. C. voltage of the power current supplied to the submerged repeater has been specified as 506 volts, but it will be appreciated that the potential of the power generator may have to be varied within wide limits depending upon the specific cable, and the distance in nautical miles from the shore at which the submerged repeater is located, and the choice of type of vacuum tubes employed in the amplifier of the submerged repeater.

While certain specific values of voltages, currents, resistances, signal power levels, and the overall transfer admittance of the submerged repeater have been specified for the illustrative form of the invention disclosed herein, it will be obvious that these values may lie within wide limits depending upon the attenuation of a specific cable, its speed of working with a submerged repeater, the location of the submerged repeater on the continental shelf, and on the level of the noise disturbance encountered, and other factors. Similarly, while the significant doubles reversals frequencies and singles reversals frequencies of 33 cycles and 66 cycles respectively have been chosen for purposes of illustration, it will be appreciated that these signal reversal frequencies may cover a wide range of frequency, depending primarily upon the overall attenuation of the specific cables in which submerged repeaters are to be inserted.

It is to be understood that the details set forth herein are not to be regarded in a restrictive sense but rather as illustrative of the novel features that characterize the invention, and that various changes and modifications are possible within the scope of the appended claims.

What is claimed is:

1. In a submarine cable system in which a nonloaded, non-coaxial telegraph submarine cable in the ocean principally lies in deep water that shields the greater length of the cable from electrical disturbance present at the surface of the water, and in which the maximum frequencies of the singles reversals and doubles reversals of the cable signals are limited by the disturbance induced in a portion of the cable lying on the bed of ocean in an area of relatively shallow water of insufficient depth to shield the cable from said disturbance; means for increasing said maximum signalling frequencies and thereby increase the signalling speed of the cable, comprising submerged apparatus enclosed in a waterproof container and in electrical circuit with a signalling conductor of the cable, said apparatus being positioned at a place on the bed of the ocean prior to said area of shallow water, said apparatus including means responsive to the signals received over the deep sea portion of the cable, means for increasing the quantitative ratio of the magnitude of said singles reversals to the magnitude of said doubles reversals of the received signals and means for amplifying said signals to a value at which the power level thereof including the singles reversals will cause the signals to override the disturbance induced in the portion of the cable in said shallow water area at said increased signalling speed, and means for transmitting said amplified signals over said portion of the cable.

2. In a submarine cable system in which a nonloaded, non-coaxial telegraph submarine cable in the ocean principally lies in deep water that shields the greater length of the cable from electrical disturbance present at the surface of the water, and in which the maximum signalling speed is limited by the disturbance induced in the receiving shore end of the cable lying on a continental shelf in an area of relatively shallow water of insufficient depth to shield the cable from said disturbance; means for increasing said maximum signalling speed of the cable, comprising submerged apparatus enclosed in a waterproof container and in electrical circuit with a signalling conductor of the cable, said apparatus being positioned at a point on said continental shelf in or adjacent to a boundary area between said deep water and said shallow water, said apparatus including means responsive to the signals received over the deep sea portion of the cable, means for increasing the quantitative ratio of the magnitude of the higher signal frequency components to the magnitude of the lower signal frequency components in said received signals and means for amplifying said frequency components to a magnitude sufficient to cause the signals to override the disturbance induced in the shore end of the cable at said increased signalling speed, and means for transmitting said amplified signals over the signalling conductor of said shore end of the cable.

3. In a submarine cable system in which a nonloaded, non-coaxial telegraph submarine cable in the ocean principally lies in deep water that shields the greater length of the cable from electrical disturbance present at the surface of the water, and in which the maximum signalling speed is limited by the disturbance induced in the receiving shore end of the cable lying on a continental shelf in an area of relatively shallow water of insufficient depth to shield the cable from said disturbance; means for increasing said maximum signalling speed of the cable, comprising submerged apparatus enclosed in a waterproof container and in electrical circuit with a signalling conductor of the cable, said apparatus being positioned at a point on said continental shelf in or adjacent to a boundary area between said deep water and said shallow water, said apparatus including means responsive to the signals received over the deep sea portion of the cable, means for increasing the quantitative ratio of the magnitude of the higher signal frequency components to the magnitude of the lower signal frequency components in said received signals to a value of approximately 15 to 1 and means for amplifying the power levels of all frequency components of the signals to a value sufficiently high to cause the signals to override the disturbance induced in the shore end of the cable at said increased signalling speed, and means for transmitting said amplified signals over the signalling conductor of said shore end of the cable.

4. In a submarine cable system in which a nonloaded, non-coaxial telegraph submarine cable in the ocean principally lies in deep water that shields the greater length of the cable from electrical disturbance present at the surface of the water, and in which the maximum frequencies of the singles reversals and doubles reversals of the cable signals are limited by the disturbance induced in the receiving shore end of the cable lying on a continental shelf in an area of relatively shallow water of insufficient depth to shield the cable from said disturbance; means for increasing said maximum signalling frequencies and thereby increase the signalling speed of the cable, comprising submerged apparatus enclosed in a waterproof container and in electrical circuit with a signalling conductor of the cable, said apparatus being positioned at a point on said continental shelf in or adjacent to a boundary area between said deep water and said shallow water, said apparatus including means responsive to the signals received over the deep sea portion of the cable, means for increasing the quantitative ratio of the magnitude of said singles reversals to the magniture of said doubles reversals of the received signals and means for amplifying said signals to a value at which the power level of the singles reversals is increased approximately 60 decibels to approximately 80 decibels above the power level of the singles reversals as received from the deep sea portion of the cable to cause the signals to override the disturbance induced in the shore end of the cable at said increased signalling speed, and means for transmitting said amplified signals over the signalling conductor of said shore end of the cable.

5. A system according to claim 1, including a cable terminal station having means for receiving the signals transmitted over the signalling conductor from said submerged apparatus, and a source of direct current power supply and means at said station for transmitting the power current over said signalling conductor of the cable for energizing the amplifying means in the submerged apparatus.

6. A system according to claim 5, in which a direct current generator source of power supply at the terminal station is employed for energizing the amplifying means in the submerged apparatus and comprising regulating means at the terminal station for automatically maintaining constant the power current supplied to the amplifying means in the submerged apparatus, means to compensate for earth potentials that may from time to time appear between the terminal station and the submerged apparatus and comprising an impedance element connected in circuit with the signalling conductor of the cable, and means operable in accordance with variations in a reference potential produced by said impedance element for controlling said regulating means.

7. A system according to claim 6, in which said regulating control means includes means for continually scanning the control circuit for detecting variations in the reference potential produced by said impedance element.

8. A system according to claim 2, including a stub cable having a pair of conductors and a metallic sheath and extending from the waterproof metal container of the submerged apparatus a short distance into the ocean, said stub cable having a conductor which electrically connects the return circuit for the said means for increasing the quantitative ratio of the signal components with the metallic sheath at the end of the stub cable in the ocean to provide a good sea earth to prevent variable potentials between said container and its contact with the sea water which may be set up by either the power current energizing the repeater or the amplified signals, from modulating the input of the amplifying means.

9. A system according to claim 2, including a cable terminal station having a receiving circuit comprising a bridge with one of the bridge arms connected to the signalling conductor of the shore end of the cable, said receiving circuit also comprising a signal-receiving instrument preceded by a signal shaping network, and means for decreasing the quantitative ratio of the magnitude of the higher signal frequency components to the magnitude of the lower signal frequency components in the received signals comprising a high frequency discriminating network coupled between the receiving bridge and the input to said signal shaping network.

10. In a submarine cable system in which a telegraph submarine cable in the ocean principally lies in deep water that shields the greater length of the cable from electrical disturbance present at the surface of the water, and in which the maximum signaling speed is limited by the disturbance induced in a portion of the cable lying on the bed of ocean in an area of relatively shallow water of insufficient depth to shield the cable from said disturbance; means for increasing said maximum signaling speed of the cable, comprising submerged apparatus enclosed in a waterproof container and in electrical circuit with a signaling conductor of the cable, said apparatus being positioned at a place on the bed of the ocean prior to said area of shallow water, said apparatus including means responsive to the signals received over the deep sea portion of the cable, means for amplifying said received signals to a value at which the power level thereof will cause the signals to override the disturbance induced in the portion of the cable in said shallow water area at said increased signaling speed, means for transmitting said amplified signals over said portion of the cable, a cable terminal station having means for receiving the signals transmitted over the signaling conductor from said submerged apparatus, and a source of direct current power supply, means at said station for transmitting the power current over said signaling conductor of the cable for energizing the amplifying means in the submerged apparatus, a bridge having its apex connected to the source of direct current power supply, and one of its bridge arms connected to the signaling conductor of the submarine cable, means including an artificial line network having the input thereof connected to the other arm of the bridge for balancing the section of cable lying between the submerged apparatus and the terminal station to thereby balance out residual voltage fluctuations occurring in said power supply, and means for neutralizing the extraneous disturbance induced in the cable in the vicinity of the terminal station comprising a stub cable having a metallic sheath and extending from said station into the ocean, said stub cable having a pair of conductors one of which is electrically connected to the cable sheath at the end of the stub cable in the ocean to provide a good sea earth and the other conductor of the pair being connected to and forming a length of the signaling conductor of said submarine cable.

11. A system according to claim 10, in which the submerged apparatus includes a spare amplifying means normally disconnected from the signaling conductor of the cable and means for selectively switching the spare amplifying means in service, and means at the terminal station for transmitting over said signaling conductor of the cable for selectively actuating the switching means in said submerged apparatus.

12. A system according to claim 11, in which said switching means in the submerged apparatus controls circuit connections therein for performing additional switching operations for effecting other circuit changes in the signaling conductor of the cable and which is responsive to switching signals transmitted from the terminal station over said signaling conductor for selectively effecting any desired one of said circuit changes.

HAROLD F. WILDER.

References Cited in the file of this patent

UNITED STATES PATENTS

| Number | Name | Date |
|---|---|---|
| 1,678,184 | Gilbert | July 24, 1928 |
| 2,020,297 | Buckley et al. | Nov. 12, 1935 |
| 2,342,544 | Jacobs | Feb. 22, 1944 |